Figure 1:
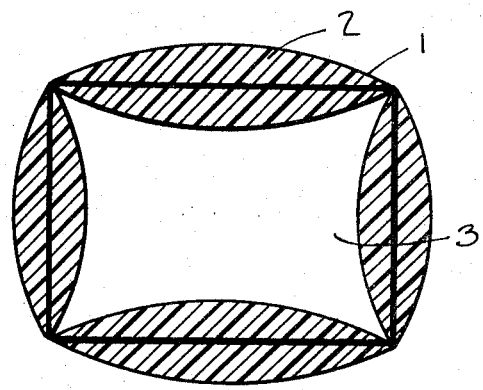

Nov. 28, 1967   C. HELLMAN ET AL   3,355,316
FOAM PRODUCT AND PROCESS
Filed Nov. 6, 1963

INVENTORS
CARL HELLMAN
JOHN BOGDANY
BY
ATTORNEYS

# United States Patent Office 3,355,316
Patented Nov. 28, 1967

3,355,316
FOAM PRODUCT AND PROCESS
Carl Hellman, West Engelwood, and John Bogdany, Lodi, N.J., assignors to General Foam Corporation, New York, N.Y., a corporation of New York
Filed Nov. 6, 1963, Ser. No. 321,904
12 Claims. (Cl. 117—98)

This invention relates to cellular, resilient, substantially non-porous structures in which a polyurethane base is impregnated with a polymer foam, and to methods for preparing such structures. It is especially adapted to the impregnation of polyurethane bases having an intercommunicating cell structure. These products are generally known as open celled foams, although the term does not imply the complete absence of closed cells.

Open cell polyurethane bases of the class used in this invention are well known. They may be prepared, for example, by reaction between polyethers or polyesters having a plurality of hydroxyl groups in the molecule and a diisocyanate such as tolylene diisocyanate or 4,4'-diphenylmethane diisocyanate. The reaction may be catalyzed by the presence of, for example, a tertiary amine catalyst such as triethylamine, trimethylamine or N-methylmorpholene. They are resilient cellular structures and are used extensively in the production of many useful products such as cushions, pads, innersoles, powder puffs and the like.

It is often possible to improve the properties of cellular polyurethanes by impregnation with various substances. Thus, they are often impregnated with film forming polymer latices such as natural or synthetic rubber latices or vinyl polymer latices to improve heat sealing properties, color stability and mechanical characteristics.

Cellular polyurethanes are especially useful for shoe innersoles and for rug backings. For these purposes, the impregnated foam after being cut to the proper configuration, is bound to the back of the rug or the inner surface of the shoe, using a suitable adhesive. However, proper binding of the polyurethane to the substrate without collapsing at least some sections of the base is difficult. The adhesive is absorbed into the cells and when pressure is applied to the foam to aid in binding, the pressure collapses the cells containing the absorbed adhesive and the cells tend to stick together. For these reasons, it has long been a problem in the art to prepare an impregnated base which is substantially non-porous so as to resist the absorption of the adhesive into the cells.

In the past, these efforts have been for the most part directed to the production of polyurethane bases having at least one non-porous surface. Generally, this has been accomplished by providing the base with a polymer film on the surface. Often the provision of the polymer film has required an additional manufacturing step in addition to the steps of impregnating and curing. Moreover, the film is often easily ruptured by ordinary handling so that the porous understructure is exposed and absorbs adhesive.

In accordance with this invention, instead of a structure with a substantially non-porous surface film a new product is provided which is itself substantially non-porous. This is accomplished by using a foam forming impregnant which is foamed after it has been impregnated into the cellular base.

Figure 2:
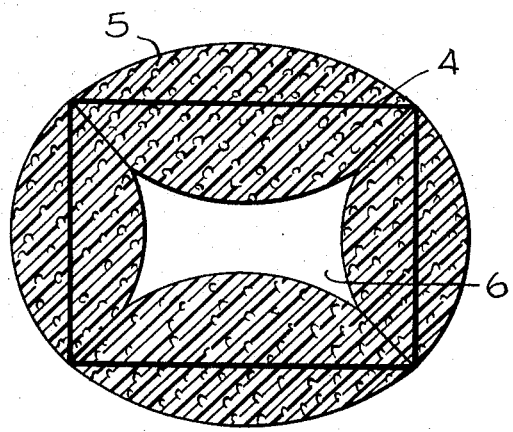

This invention may be more fully understood by reference to the accompanying drawings in which FIG. 1 represents an idealized cell structure in previously known products and FIG. 2 represents a comparable cell structure of a product of this invention.

A brief discussion of a normal resilient, cellular, unimpregnated polyurethane base will aid in the understanding of the invention represented by the drawings. Open cell polyurethane products may be considered as a mass of randomly oriented strands criss-crossing and interlocking with each other to form diverse geometrical patterns. The so-called cells in open cell polyurethane are not true cells in the sense that each is formed by a substantially continuous wall. Rather they are small increments of volume described by a number of strands in close proximity to each other. They are nonetheless called cells and will be referred to herein as such.

Referring now to FIG. 1, there is illustrated a rectangular strand 1 which may be considered as showing one plane only of a cell in an open cell polyurethane. The impregnant represented by 2 is formed around each segment of the strand 1. There is thus described a fairly large space 3 surrounded by impregnant 2 supported by strand 1. Of course, in an actual cell the space 3 would have depth and be irregular in configuration. The adhesive is absorbed into this relatively large irregular space which is of course, only one small section of a larger structure.

FIG. 2 represents a similar structure in accordance with this invention. In the figure, 4 is the strand surrounded by foamed impregnant 5 which defines a much smaller space 6. The volume represented by 6 is so much smaller than the analagous volume represented by 3 that the adhesive is not absorbed.

Stated very simply, the products of this invention as compared with previously known structures are substantially non-porous because the cells are too small to permit absorption. It is, of course, understood that not all strands in either the prior art structures or the structures described herein are coated with impregnant and that not all cells in the products are smaller than each and every cell in the prior art products.

The advantages of this invention are achieved by foaming the impregnant after impregnation. The specific gravity of the impregnant, after foaming and curing according to the method of this invention is very low, for example, from about 0.10 to about 0.35 compared to a specific gravity of from about 1.0 to 1.5 for the cured impregnants of previously known products.

The impregnants used herein are formed with film forming polymer latices and include polymer latices formed from polymers of ethylenically unsaturated monomers. They include natural and synthetic rubber latices and vinyl latices. Synthetic rubber latices may include those formed, for example, from butadiene-acrylonitrile, butadiene-styrene and various chloroprene copolymers.

Vinyl latices include those formed from vinyl chloride homopolymers and copolymers, interpolymers and terpolymers with other unsaturated monomers, and mixtures of the homopolymers with other vinyl chloride copolymers, interpolymers and terpolymers more particularly those vinyl chloride copolymers containing a predominant amount of vinyl chloride, i.e. at least about 50% but preferably more. The preferred vinyl latices of this invention are prepared from copolymers of vinyl chloride and vinyl acetate containing up to 15% by weight of the latter.

Other ethylenically unsaturated monomers which are useful in the preparation of the products of this invention include, for example, lower alkyl esters such as the aforesaid vinyl acetate and partially hydrolyzed vinyl acetate, diethyl maleate, vinyl benzoate and the like; lower alkyl acrylates, such as methyl, ethyl, butyl and octyl acrylate and the like, as well as the corresponding methacrylates; alkyl esters of unsaturated acids such as maleic and fumaric acid; acrylonitrile; halogenated hydrocarbons such as vinylidene chloride and fluoride, vinyl fluoride, chlorotrifluoroethylene and others.

The latices as formed comprise the film forming polymer dispersed in an aqueous composition which may contain other ingredients such as vulcanizers, accelerators, stabilizers, soaps and other surface active agents, coloring agents and others. Most commercial latices are alkaline and contain a heat sensitive gelling agent which when heated decomposes to products which decrease the pH of the latex usually to the acid side of neutrality thereby causing the latex to gel. For example, many rubber latices used as impregnants contain ammonium hydroxide which causes the rubber polymer to coagulate or gel as the impregnated product passes through the curing oven or is otherwise heated. With these rubber latices the heat of the curing oven vulcanizes the rubber, volatilizes the water carrier and decomposes the ammonium hydroxide. The decomposition of the ammonium hydroxide causes the pH to decrease and the rubber to gel. In so doing, the rubber passes through a flowable state to a substantially non-flowable state with some mechanical strength and finally forms a relatively hard film.

The preferred latices of this invention are rubber latices containing from about 40 to 65% film forming polymers by weight on a dry weight basis.

The film forming polymer latices of this invention also contain a water immiscible volatile liquid whose boiling point is substantially the same as the temperature at which gel formation takes place. The liquid may be emulsified in the latex for greater efficiency. The liquid volatilizes and forms the impregnant while it is gelling. It is important that most of the volatilization of the water immiscible liquid take place while the gel is in the non-flowable state in which it has some mechanical strength. If the major proportion of a volatilization takes place before this point, the vapors simply pass out with forming a foam. If it takes place afterwards, the vapors are trapped under the film. They merely rupture the film to break out without forming a foam.

Many volatile liquids are useful in this invention. These include, for example, ethers, esters, hydrocarbons and halogenated hydrocarbons. They should of course, be relatively inert towards the other ingredients in the latex. The preferred liquids or foaming agents are hydrocarbons and halogenated hydrocarbons and mixtures thereof such as hexane, heptane, trichlorotrifluoroethane and trifluoromethane. The preferred temperature range then is from about 75° F. to about 215° F. The temperature however is not critical. It is only necessary that the major portion of the blowing agent volatilize while gellation is taking place.

Many combinations of gelling agents and blowing agents are possible. Of these ammonium acetate and polyvinylmethyl ether with hexane or trichlorotrifluoroethane are preferred. The ammonium acetate is believed to function by decomposing to form ammonia which is driven off by the heat and acetic acid which gels the latex. The action of polyvinylmethyl ether is believed to be mechanical. This substance has the unusual property of being less soluble in hot water than in cold. Gellation is believed to take place by coprecipitation of the ether and the latex as the temperature of the impregnated polyurethane base increases.

Impregnation may be effected by any of the usual means. For example, a sheet of open cell polyurethane may be passed through a reservoir of impregnant in a tank fitted with pressure rolls. As the sheet passes through the rolls the air is displaced from the cells. It is replaced with impregnant as the sheet leaves the rolls. Excess impregnant may be removed by passing the impregnated sheet through pressure rolls stationed above the reservoir.

The following non-limiting examples are given by way of illustration only. In these examples the amounts of ingredients are given on a dry weight basis although some of them are added in water.

EXAMPLE I

The following ingredients are thoroughly mixed by high speed stirring:

| | |
|---|---|
| Natural rubber latex (62%) | 60.00 |
| Potassium oleate aqueous soln. (20%) | 2.00 |
| Aqueous dispersion of styrene-butadiene foaming resin (62%) | 40.00 |
| Sulfur dispersion in water (68%) | 2.00 |
| Dispersed zinc salt of 2-mercaptobenzothiazole in water (65%) | 1.00 |
| Slurry of zinc diethyl dithiocarbamate (50%) | 2.00 |
| Dispersed zinc oxide (60%) | 4.00 |
| Emulsion of styrenated phenol type antioxidant (65%) | 1.00 |
| Clay filler | 60.00 |

To this mixture there is added 10.00 parts by weight of hexane and the mixture is thoroughly stirred.

There is then added 0.3 part of ammonium acetate in water and the resulting mixture is used to impregnate a polyurethane base comprising a sheet of open cell polyurethane one-quarter inch thick.

The impregnated base is then guided through a curing oven of the air circulating type at a temperature of 300° F. at a rate such that each segment of the product is in the oven for about four minutes.

EXAMPLE II

The following ingredients are thoroughly mixed:

| | |
|---|---|
| Natural rubber (62%) | 60.00 |
| Potassium oleate soln. (20%) | 2.00 |
| Styrene-butadiene foaming resin (62%) | 40.00 |
| Dispersed sulfur (68%) | 2.00 |
| Dispersed zinc salt of 2-mercaptobenzothiazole (65%) | 1.00 |
| Slurry of zinc diethyl dithiocarbamate (50%) | 2.00 |
| Dispersed zinc oxide (60%) | 4.00 |
| Emulsion of styrenated type antioxidant (65%) | 1.00 |
| Clay filler | 60.00 |

To this mixture there is added 5.00 parts of a 50% aqueous emulsion of hexane prepared by thoroughly mixing the following ingredients:

| | |
|---|---|
| Hexane | 50.00 |
| Oleic acid | 2.00 |
| Potassium hydroxide | .55 |
| Water | 47.55 |

The resulting mixture is impregnated into an open cell polyurethane base three-eights inch in thickness and cured as described in Example I.

EXAMPLE III

A composition containing the following ingredients is thoroughly mixed and the pH adjusted to 9.0 with 1% acetic acid:

| | |
|---|---|
| Natural rubber latex (62%) | 60.00 |
| Potassium oleate aqueous soln. (20%) | 2.00 |
| Styrene-butadiene foaming resin (62%) | 40.00 |
| Sulfur dispersion (68%) | 2.00 |
| Dispersed zinc salt of 2-mercaptobenzothiazole (65%) | 1.00 |
| Slurry of zinc diethyl dithiocarbamate (50%) | 2.00 |
| Dispersed zinc oxide (60%) | 4.00 |
| Emulsion of styrenated phenol type antioxidant (65%) | 1.00 |
| Clay filler | 60.00 |

To this mixture at room temperature there is added 5 parts by weight of polyvinyl methyl ether in a 50% aqueous composition.

An open cell polyurethane base one-half inch thick is impregnated with this mixture and the resulting product cured at approximately 180° F.

Although particular embodiments of this invention are herein disclosed for purposes of explanation various modifications thereof after study of this specification will be apparent to those skilled in the art to which this invention pertains. Reference should accordingly be had to the appended claims in determining the scope of the invention.

What is claimed and desired to be secured by Letters Patent is:

We claim:
1. A cellular, resilient, substantially non-porous polyurethane structure consisting essentially of an open cell polyurethane foam substrate in which the major proportion of the strands describing the open cells are surrounded with a foamed polymer which is formed from ethylenically unsaturated monomers.
2. A structure as in claim 1 in which the foamed polymer is natural rubber.
3. A structure as in claim 1 in which the foamed polymer is a synthetic rubber.
4. A structure as in claim 1 in which the foamed polymer is a vinyl polymer.
5. A structure as in claim 1 in which the foamed polymer is a vinyl chloride polymer.
6. A structure as in claim 1 in which the foamed polymer is a vinyl chloride-vinyl acetate copolymer containing at least 50% by weight of vinyl chloride.
7. A process of forming a cellular, resilient, substantially non-porous polyurethane structure consisting essentially of an open cell polyurethane foam substrate in which the major proportion of the strands describing the open cells are surrounded with a foamed polymer which is formed from ethylenically unsaturated monomers which comprises impregnating the polyurethane foam substrate with a latex of the said polymer formed from ethylenically unsaturated monomers and containing a heat-sensitive gelling agent and a water-immiscible liquid foaming agent, the major portion of which volatilizes at substantially the same temperature at which the gelling agent gells the latex, and raising the temperature thereby to effect gellation of said latex and volatilization of said water-immiscible liquid foaming agent.
8. A process as in claim 7 in which the foamed polymer is natural rubber.
9. A process as in claim 7 in which the foamed polymer is a synthetic rubber.
10. A process as in claim 7 in which the foamed polymer is a vinyl polymer.
11. A process as in claim 7 in which the foamed polymer is a vinyl chloride polymer.
12. A process as in claim 7 in which the foamed polymer is a vinyl chloride-vinyl acetate copolymer containing at least 50% by weight of vinyl chloride.

References Cited

UNITED STATES PATENTS

| | | | |
|---|---|---|---|
| 2,257,911 | 10/1941 | Kraft | 117—98 |
| 2,354,430 | 7/1944 | Greenup et al. | 117—139 |
| 2,862,284 | 12/1958 | Wiczer | 117—8 X |
| 2,955,056 | 10/1960 | Knox | 117—98 |
| 2,963,388 | 12/1960 | Landouar | 117—138.8 |
| 2,972,554 | 2/1961 | Muskat et al. | 117—98 X |
| 2,996,409 | 8/1961 | Lavely | 117—161 X |
| 3,061,460 | 10/1962 | Schickedanz | 117—138.8 X |
| 3,083,124 | 3/1963 | Rahmes | 117—163 |
| 3,114,722 | 12/1963 | Einhorn et al. | 260—2.5 |
| 3,147,137 | 9/1964 | Glass et al. | 117—161 X |

FOREIGN PATENTS

| | | |
|---|---|---|
| 815,898 | 7/1959 | Great Britain. |
| B 29,206 | 3/1956 | Germany. |

WILLIAM D. MARTIN, *Primary Examiner.*

MURRAY KATZ, *Examiner.*

R. HUSACK, *Assistant Examiner.*